(No Model.)
F. F. LANDIS.
TRACTION ENGINE.
No. 368,772. Patented Aug. 23, 1887.
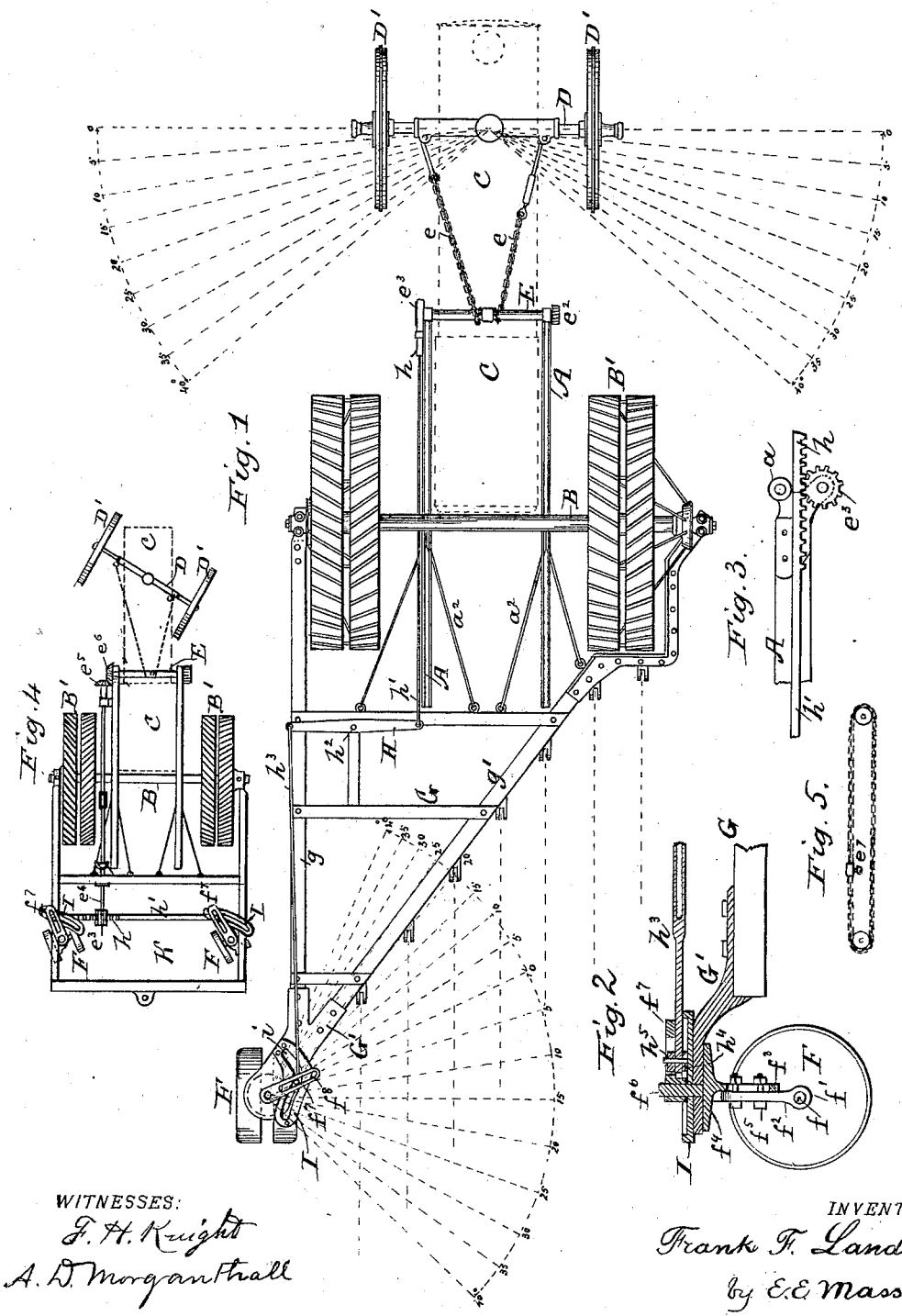
WITNESSES:
F. H. Knight
A. D. Morganthall
INVENTOR
Frank F. Landis
by E. E. Masson
Attorney.

UNITED STATES PATENT OFFICE.

FRANK F. LANDIS, OF WAYNESBOROUGH, PENNSYLVANIA.

TRACTION-ENGINE.

SPECIFICATION forming part of Letters Patent No. 368,772, dated August 23, 1887.

Application filed April 24, 1884. Serial No. 129,126. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Apparatus for Steering Traction-Engines, Gang-Plows, and other Vehicles, of which the following is a specification, reference being had therein to the accompanying drawings, in which—

Figure 1 is a top view of my apparatus applied to the frame of a traction-engine carrying the main beam and frame of a gang-plow. Fig. 2 is a vertical section through the rear steering-wheel axle and adjacent parts thereof. Fig. 3 is a side view of the forward end of the engine-frame carrying the pinion and rack controlling the rear steering wheel or wheels of the plow or vehicle. Fig. 4 is a top view of a traction-engine frame, having the tender thereof supported by a pair of steering-wheels on each side. Fig. 5 represents an endless chain adapted to connect the steering mechanism of the front and rear trucks.

My invention relates to apparatus for steering long vehicles around comparatively short corners or curves, and is particularly designed to facilitate the guiding of steam-plows and traction-engines, although applicable to other vehicles; and the object of my improvement is to provide simple means for connecting the steering mechanism of the front truck of the vehicle with steering-wheels located at the rear end or rear portion of said vehicle, whereby the turning of the front truck toward one side will cause the rear or steering wheels to be pointing toward the opposite side, and thus facilitate the turning of the vehicle around a short curve or circle, or even within its own length. I attain these objects by the mechanism illustrated in the accompanying drawings, in which similar letters refer to similar parts throughout the several views.

The main frame of the engine is represented at A. It is composed of two parallel plates, one each side, kept a few inches apart by steadying blocks or parts of the engine-frame, and rivets or bolts passing therethrough. This frame is supported by or suspended from the axle B of the traction-wheels B', substantially as shown in Patent No. 286,313, granted to me October 9, 1883.

The forward half of the frame A, carrying the rear portion of the boiler, (shown by dotted lines at C,) and the front portion of said boiler is carried upon the front truck or axle D, supported by the forward steering-wheels, D'. Upon the forward end of the frame A is mounted in suitable bearings the transverse shaft E, around which one end of each steering-chain $e$ is coiled, but in opposite directions, so that by revolving the shaft it will, as usual, wind one of the chains and unwind the other; and the opposite end of each chain being fastened to the axle D, will pull either end of said axle toward one side of the machine; but as the angle made by said axle with the side of the boiler is seldom required to be more than forty degrees, the diameter of the shaft E is generally such that one revolution thereof will turn the front truck or axle, D, an arc of forty degrees. Upon one end of the shaft E is mounted a pinion, $e^2$, adapted to mesh with a worm-wheel, and the latter is controlled, as usual, by a crank or hand-wheel under the guidance of the steersman or driver.

Upon the opposite end of the shaft E is mounted a pinion, $e^3$, (shown in Fig. 3,) to operate upon and control the axle of the rear steering truck or wheels, F, as will be hereinafter described. This steering-truck is represented in the drawings as attached to the rear end of a gang-plow frame, G; but it may be secured to the rear end of the engine-frame, its tender or other vehicle attached to said engine-frame, as shown in Fig. 4, in which a steering-truck, F, is represented on each side of the tender or frame secured to the ends of the traction-engine axle B.

Various forms may be given to the steering-truck; but I prefer the form given in the drawings. It consists of a pair of wheels, through which passes a short axle, $f$, upon which is mounted a sleeve, $f'$, carrying a standard, $f^2$, that is connected to the pendent arm $f^3$ of a horizontal bearing-plate, $f^4$, by means of transverse bolts $f^5$, passing through vertical slots in the standard $f^2$ and arm $f^3$. These slots may be dispensed with when the steering-truck simply carries the tender of the engine; but they are necessary when said truck carries the rear end of a gang-plow beam, so as to regulate the depth of the furrow. Projecting upward from the center of the bearing-plate $f^4$ is a short shaft, $f^6$, to the upper end of which is keyed the lever $f^7$, through which control is obtained over and direction given to the truck-wheels F, that would otherwise be uncontrolled by caster-wheels only. Before securing the lever $f^7$ upon its shaft $f^5$, the rear end of the plow-frame G (or it may be the engine-tender) is connected therewith. For this purpose there is bolted to the rear end of the beams $g$ and $g'$ of the gang-plow a plate, G', curved upward to make room thereunder for the wheel or wheels, and extending horizontally upon the bearing-plates $f^4$ of said wheels. It is bored vertically to receive the bolt $f^6$, to which the controlling-lever $f^7$ is attached. Said lever may be simply connected with the forward steering-shaft, E, or its pinion $e^3$, by means of a rack, $h$, upon the end of the rod $h'$, having its rear end connected with one end of a walking-beam, H, pivoted to the frame of the plow at $h^2$, and a rod, $h^3$, connected to the opposite end of said walking-beam, with the caster-wheel controlling-lever $f^7$; but after many trials I found that when the rear steering-wheels are on the side of the central axis of the machine either the angle or direction to the rear steering-truck from the transverse shaft E, operating upon the front truck, did not correspond with the direction of said front truck, (to travel upon a given curve,) or the connecting-rods between them became subjected to too much tension, or became too slack while steering, according to the radius of the path followed by the machine. To overcome these defects I secure upon the plate G at the rear end of the gang-plow frame, a stationary cam or grooved plate, I, having an approximately S-shaped groove, $i$, adapted to receive a small friction-roller, $h^4$, secured to the rear end of the rod $h^3$, and the caster-wheel controlling-lever $f^7$ is provided with a longitudinal slot, $f^8$, to receive a similar friction-roller, $h^5$, secured also to the rod $h^3$. The friction-roller $h^5$ is secured to the top side of the rod $h^3$, while the roller $h^4$ is secured to the under side upon the same pin passing vertically through said rod. The latter is made at that point of a flat bar, while the balance of it is preferably made of gas-pipe. A friction-roller, $a$, is mounted on the forward end of the frame A to bear upon the rack $h$ and keep it in gear with the pinion $e^3$. The form of the groove $i$ in the guide-plate I will vary according to the location of said plate upon the frame and its distance from the center of the machine.

Traction is transmitted to the gang-plow frame G by means of diagonally-arranged rods $a^2$, secured at one end to the frame A of the engine and at the other to the first cross-beam of the gang-plow. The side beams, $g$ and $g'$, thereof are simply connected at their fore end to a forked arm pendent from each end of the main axle B to adjust the height of that end of the plow-frame, (and will be fully described in a companion application.)

In Fig. 4, in place of a plow-frame, the frame of an engine-tender is represented at K. The latter is supported upon two pairs of caster-wheels, and each pair is provided with a slotted controlling-lever, $f^7$, and the latter are united by a transverse rod, $h'$, carrying a rack, $h$, that meshes with a broad-faced pinion, $e^3$, and the latter is mounted upon a jointed shaft, $e^4$, that is provided with a bevel-pinion, $e^5$, to mesh with another bevel-pinion, $e^6$, upon the forward steering-shaft, E. The shaft $e^4$ is made in pieces connected by a sleeve and universal joints, so that it can accommodate itself to any slight variations in the distance between the engine and its tender, or any difference in height between them; otherwise the principle of operation is the same as in Fig. 1, as a grooved plate, as I, is used also to guide the controlling-lever $f^7$ of the caster-wheels.

Various other means could be used to connect the controlling-lever of the rear steering-wheels, F, of a gang-plow constructed in accordance with my invention. For example, an endless chain (shown in Fig. 5) may be made to pass around a sprocket-wheel upon the shaft E at the front end of the machine and around a guide-pulley mounted upon the rear extremity of the plow-frame, and be provided with a large link and a pin, $e^7$, to enter the slots in the guide-plate I and grooved lever $f^7$. (Shown in Fig. 1.)

Having now fully described my invention, I claim—

1. A traction-engine having its weight mainly upon substantially centrally-arranged driving-wheels and provided with leading and steering wheels connected together and having their plane of rotation in a circle having a common center, the radii of which are passing approximately through the axles of all the wheels, substantially as and for the purpose described.

2. The combination of a traction-engine frame, its forward leading-wheels, the controlling-shaft E, having a pinion thereon, and a rack connected with said pinion, with the rear steering-wheels, F, the controlling-lever $f^7$ thereof, and means for connecting said lever with the shaft E, substantially as described.

3. The combination of a traction-engine frame, a detachable frame or tender, G, secured thereto, a pair of leading-wheels, D', and the controlling-shaft thereof, with rear steering-wheels, F, the controlling-lever thereof provided with a longitudinal slot, the slotted plate I, and a pin passing through the slots made in the controlling-lever and said slotted plate, substantially as and for the purpose described.

In testimony whereof I affix my signature in presence of two witnesses.

FRANK F. LANDIS.

Witnesses:
E. E. MASSON,
L. C. HILLS.